United States Patent [19]

Liebler et al.

[11] Patent Number: 5,449,557
[45] Date of Patent: Sep. 12, 1995

[54] COMPATIBLE POLYMER MIXTURES

[75] Inventors: Ralf Liebler, Darmstadt; Werner Ringenberg, Weiterstadt, both of Germany

[73] Assignee: Röhm GmbH, Darmstadt, Germany

[21] Appl. No.: 579,268

[22] Filed: Sep. 5, 1990

Related U.S. Application Data

[63] Continuation of Ser. No. 425,396, Oct. 20, 1989, abandoned, which is a continuation of Ser. No. 227,454, Aug. 2, 1988, abandoned, which is a continuation of Ser. No. 863,969, May 16, 1986, abandoned.

[30] Foreign Application Priority Data

May 23, 1985 [DE] Germany .......... 35 18 538.4

[51] Int. Cl.$^6$ .......... C08L 27/06; C08L 27/16; C08L 69/00
[52] U.S. Cl. .......... 428/412; 428/421; 428/522; 525/148; 525/199; 525/239
[58] Field of Search .......... 525/148, 199, 239; 428/412, 421, 522

[56] References Cited

U.S. PATENT DOCUMENTS

| | | | |
|---|---|---|---|
| 2,450,000 | 9/1948 | Howk | 260/83 |
| 2,673,194 | 3/1954 | Grim | 260/93.5 |
| 3,107,199 | 10/1963 | Tocker | 161/231 |
| 3,159,646 | 12/1964 | Milionis et al. | 260/308 |
| 3,253,060 | 5/1966 | Koblitz et al. | |
| 3,265,760 | 8/1966 | Tocker | 260/836 |
| 3,399,173 | 8/1968 | Heller et al. | 260/47 |
| 3,458,391 | 7/1969 | Miller | 161/189 |
| 3,582,398 | 6/1971 | Ringler | 117/33.3 |
| 3,957,921 | 5/1976 | Iwahashi et al. | 260/901 |
| 4,045,514 | 8/1977 | Iwahashi et al. | 260/873 |
| 4,245,058 | 1/1981 | Liu | 525/148 |
| 4,260,693 | 4/1981 | Liu | 525/148 |
| 4,263,416 | 4/1981 | Liu et al. | 525/148 |
| 4,320,212 | 3/1982 | Liu | 525/148 |
| 4,576,870 | 3/1986 | Liebler et al. | 525/148 |

FOREIGN PATENT DOCUMENTS

| | | |
|---|---|---|
| 2464287 | 3/1981 | France . |
| 1269799 | 6/1968 | Germany . |
| 23248709 | 8/1983 | Germany . |
| 23244953 | 6/1984 | Germany . |
| 979868 | 1/1965 | United Kingdom . |
| 1182807 | 3/1970 | United Kingdom . |
| 2057461 | 4/1981 | United Kingdom . |
| 2137935 | 10/1984 | United Kingdom . |
| 2146647 | 4/1985 | United Kingdom . |

OTHER PUBLICATIONS

Polymer-Polymer Miscibility, Olabisi et al., Academic Press, New York, 1979 pp. 338, 339.

(List continued on next page.)

Primary Examiner—Thomas Hamilton, III

[57] ABSTRACT

A compatible, single-phase, polyblend comprising

I) a polymer which is a polycarbonate, polyvinyl chloride, or polyvinylidene fluoride, and II) a copolymer comprising from 40 to 99.99 percent by weight of A) a monomeric ester formed between acrylic acid or methacrylic acid and a C1–C10 alcohol, and from 0.01 to 60 percent by weight of B) a monomer of the formula $$H_2C=\underset{R_1}{\overset{\phantom{|}}{C}}-\overset{O}{\overset{\|}{C}}-Y-Z \qquad (I)$$

wherein $R_1$ is hydrogen or methyl, Y is oxygen or $-NR_2-$ where $R_2$ is hydrogen or alkyl, and Z is i) a 2-hydroxyphenyl benzotriazole, ii) a 2-hydroxybenzophenone or 2-hydroxyacetophenone, iii) an alpha-cyano-beta,beta-diphenyl, and C) optional other monomers.

7 Claims, No Drawings

OTHER PUBLICATIONS

Neue Verpackung (New Packaging), Jul. 1978, Djordjevic, p. 1045.
Autoadhesion and Adhesion of High Polymers, S. S. Voyutskii, Interscience Publishers, New York, (1963), p. 197.
Comprehensive Polymer Science, vol. 2, Pergamon Press, New York, p. 719.
Kirk–Othmer, Encyclopedia of Chemical Technology, Third Edition, vol. 18, John Wiley & Sons, New York, pp. 443–478.
"Modern Plastics Encyclopedia" 1978–1979, pp. 222, 225, 226, Abramoff.
Chem. Abstr. 94, 175780x (1981).
Chem. Abstr. 98, 17556q (1983).
Chem. Abstr. 81, 137058s (1974).
Chem. Abstr. 83, 80438a (1975).
Razinskaya et al., Polymer Science USSR 27, 204–213 (1985).

COMPATIBLE POLYMER MIXTURES

This application is a continuation of Application No. 07/425,396 filed Oct. 20, 1989 and now abandoned, which in turn is a continuation of Application No. 07/227,454 filed August 1988 and now abandoned, which in turn is a continuation of Application No. 06/863,969 filed May 16, 1986 and now abandoned.

The present invention relates to mixtures of compatible polymers consisting of certain synthetic polymers and copolymers comprising acrylates and methacrylates and containing ultraviolet absorbers.

Such polymer blends ("polyblends") are especially adaptable to coating synthetic resins.

As a rule, different polymer species are considered mutually incompatible, i.e. unless one component is present at a very low level the species generally do not form a homogeneous phase characterized by complete miscibility of the components.

Certain exceptions to this rule are becoming increasingly interesting, especially among those skilled in the art who are concerned with the theoretical significance of the phenomenon. The miscibility of different species of polymer is primarily ascribed to a low mixing entropy (because of the long polymer chains) and to a positive mixing energy. Completely compatible mixtures of polymers exhibit perfect solubility (miscibility) in all mixing proportions.

A comprehensive summary of miscible polymer systems can be found for example in D. R. Paul et al., in *Polymer & Engineering Science* 18, (16) 1225–34 (1978) and in *J. Macromol. Sci.-Rev. Macromol. Chem C.* 18, (1) 109–168 (1980).

The glass-transition temperature, Tg, and what is called the "optical method" (the clarity of a sheet poured from a homogeneous solution of a polyblend) are often called upon to demonstrate miscibility (cf. Brandrup-Immergut, *Polymer Handbook*, 3rd Ed., 211–213).

Another test involves the occurrence of the lower critical solution temperature. This is the temperature at which an originally clear and homogeneous polymer blend separates into phases and becomes cloudy to opaque. The literature considers this test to be an unambiguous proof that the original polymer blend had consisted of a single homogeneous phase in equilibrium.

The systems polyvinylidene fluoride with polymethyl methacrylate or with polyethyl methacrylate (cf. U.S. Pat. Nos. 3,253,060; 3,458,391; and 3,459,843) are exemplary of miscibility. More recent results with polymer blends and their potential applications are reported by L. M. Robeson in *Polymer Engineering & Science* 24, (8) 587–597 (1984). Physical studies of the physics of blends of polycarbonate with polymethyl methacrylate seem to indicate a specific interaction between the two homopolymers in the blend (cf. Chem. Abstr. 94, 175780x). There have also been many attempts to exploit the advantageous properties of blends of polycarbonate and acrylic resins. A copolymer of methyl methacrylate, styrene, and glycidyl methacrylate has been made compatible with polycarbonate by extruding the resulting blend with benzyl methylamine (cf. Japanese patent publication 82-117, 563 and Chem. Abstr. 98, 17556g).

Polymethyl methacrylate and polycarbonate are reported to have slightly more satisfactory mechanical properties as a molding compound when blended than each does individually (cf. British patent publication 1,182,807). Ternary blends of the copolymers of (1) a methacrylate ester with a vinyl aromatic and/or a vinyl cyanide, (2) a copolymer of ethylene and vinyl acetate, and 40 to 95 percent of polycarbonate have been recommended for their good thermal, mechanical, and processing properties (cf. Japanese patent publication 49-041,444 abstracted in Chemical Abstracts 83, 80438a (1975). Also, ternary blends containing (1) homopolymers or copolymers of methyl methacrylate, (2) copolymers of styrene and methyl methacrylate, and (3) polycarbonate are employed as molding compounds (cf. German patent publication 2,357,586). Resin blends of polymethyl methacrylate, polycarbonate, and a polyacetal are known from Japanese patent publication 50-019852 abstracted in Chemical Abstracts 81, 137058s (1974).

Modifying the impact resistance of polycarbonate by adding other polymers to create ternary blends has also been frequently described. Thus, German patent publication 3,031,524 recommends adding alkyl acrylate or methacrylate polymers and olefin-alkyl acrylate polymers. The addition of copolymers of butadiene and styrene together with alkyl(meth) acrylate polymers to polycarbonate has also been described (cf. French patent publication 2,464,287 and British patent publication 2,057,461), as has the addition of polypropylene (cf. U.S. Pat. No. 4,245,058), organic silicones (German patent publication 3,031,539), polyesters (U.S. Pat. No. 4,320,212), and ABS copolymers (German patent publication 3,248,709). Polycarbonate modified with polyolefin has practical applications in the automobile industry as do blends of polycarbonate and polybutylene terephthalate.

It can accordingly hardly be expected that these polymer blends could be exploited to obtain qualitatively new and technically valuable results.

Among the drawbacks that many synthetic resins exhibit, but which are lacking in metals or minerals as materials, is their more or less high sensitivity to ultraviolet light. The damage that has been observed from this type of radiation is similar to that caused by thermal oxidation, namely discoloration, embrittlement, and deterioration of physical parameters. These results are especially obvious in polyolefins, polyvinyl chloride, polystyrene and modified polystyrene, polyvinylidene fluoride, and polycarbonate. There has accordingly been no lack of attempts to make polymers more resistant to ultraviolet light by adding effective anti-ultraviolet stabilizers and antioxidants. Ultraviolet absorbers that absorb radiation in the 200 to 400 nm range are most frequently employed to stabilize the material against ultraviolet light (Ullmann's *Encyklopaedie der Tech. Chemie*, Vol. 15, 4th Ed. [1987], Verlag Chemie, 253–266).

However, there are problems in the use of ultraviolet absorber. The absorbers employed in practice with plastics are frequently volatile at the temperatures characteristic of the manufacture and processing of synthetic resins like polycarbonate for example. This is true, for example, of what are probably the most frequently employed anti-ultraviolet plastic stabilizers, namely substituted 2-hydroxybenzophenones and substituted benzotriazoles.

Compounds of this kind having longer alkyl side chains are usually preferred because they are less volatile during processing. The literature points out, however, that there is a limit to chain length, specifically one imposed by compatibility with the polymer. If the chain is too long, the ultraviolet absorber tends to become incompatible (cf. *Modern Plastics Encyclopedia*, McGraw-Hill, 1978–79, p. 222). The random doping of plastics with ultraviolet absorbers is not an especially rational procedure considering not only the losses that occur during processing but also how little of the ultraviolet absorber actually gets to take effect. There has accordingly been somewhat of a transition to applying a coating of lacquer containing an ultraviolet absorber to the surface of plastic bodies rather than including them in the material itself (cf. e.g. German published patent application 1,694,273).

One method that has been proposed, for example in coextruding hollow plastic slabs with a core of polycarbonate and an ultraviolet-absorbing layer on at least one side of the core, involves bonding an ultraviolet absorbing layer containing at least 2 percent by weight of a volatile ultraviolet absorber to at least one side of the core in a multicomponent extruder, bonding an outside layer containing less than 2 percent by weight of volatile ultraviolet absorbers to the surface of the absorbent layer that is remote from the core, and treating the multilayer billet further in a vacuum forming channel after it leaves the die (German published patent application 3,244,953).

There is just as much of a need as ever for a method for permanently protecting plastics from the action of ultraviolet light that will not have a deleterious effect on the other properties of the materials. A prerequisite, of course, is that any ultraviolet-absorbing additive must be compatible with the plastic.

It has now been discovered that many synthetic resins containing certain copolymers of acrylates and methacrylate are compatible (miscible) over wide ranges of concentration and temperature. These miscible polyblends exist in a homogeneous phase that macroscopically exhibits the properties expected Of a single phase system. Blends of transparent resins exist in practically completely clear single-phase systems. Miscible polyblends have as a rule a single glass transition temperature, Tg.

More in particular, the present invention concerns compatible (single phase) polyblends formed from I) a polymer which is a polycarbonate, polyvinyl chloride, or polyvinylidene fluoride and from II) a copolymer consisting of (A) 40 to 99.99 percent and preferably from 50 to 60 percent, by weight of the copolymer of a monomeric ester of acrylic and/or methacrylic acid with a $C_1$ to $C_{10}$ alcohol, and (B) 0.01 to 60 percent, in particular 0.1 to 60 percent, and preferably 40 to 50 percent, by weight of the copolymer of a monomer of the formula

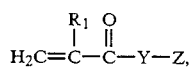

wherein $R_1$ is hydrogen or methyl, Y is oxygen or $-NR_2-$, wherein $R_2$ is hydrogen or alkyl having 1 to 6 carbon atoms, and Z is i) a 2-hydroxyphenyl benzotriazole group of the formula

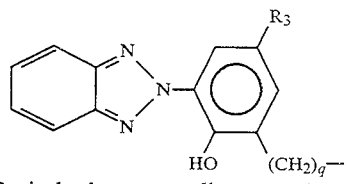

wherein $R_3$ is hydrogen or linear or branched alkyl having 1 to 12 carbon atoms and q is 0 or a number from 1 to 4, Z being bonded to the rest of the molecule either through oxygen or $-(CH_2)-_q$ or directly onto phenyl, with every free position being occupied by hydrogen, with halogen substituents also possibly present, and with the benzotriazole ring possibly being substituted by alkyl having 1 to 4 carbon atoms or halogen, ii) a 2-hydroxybenzo- or -acetophenone group of the formula

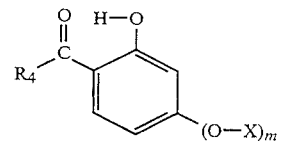

wherein m is 0 or 1, X is alkylene having 1 to 4 carbon atoms possibly substituted by hydroxy, and $R_4$ is phenyl or methyl, possibly substituted, or iii) an alpha-cyano-beta,beta-diphenyl group

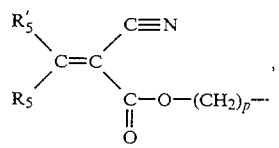

wherein p is an integer from 1 to 4 and $R_5$ and $R'_5$ are phenyl optionally substituted by $C_1-C_4$ alkyl, and (C) from 0 to 15 percent and preferably 0.5 to 10 percent, by weight of the copolymer, of other monomers.

The molecular weight of the copolymer (II) generally ranges from 10,000 to 70,000 and preferably from 20,000 to 30,000, as determined by gel chromatograpy.

The amounts of polymer I and copolymer II in the miscible polyblends in accordance with the invention can, respectively, be between 50 and 99.9 percent by weight and between 0.1 and 50 percent by weight.

The miscible polyblends according to the invention satisfy all the state of the art criteria for compatible blends, as earlier discussed herein. For example, they exist in a homogeneous phase at temperature ranges that are relevant in practice, from 20° C. to the softening point. Macroscopically they exhibit the properties expected of a single phase system, for example isotropy with respect to external influences to the extent that such is also exhibited by other comparable single phase synthetic resins.

Blends of transparent resins exist in the form of practically completely clear single phase systems. As miscible polyblends they exhibit, to the extent that they have been investigated, a single glass transition temperature, Tg, independent of the means of determination (cf. D. R. Paul and S. Newman in *Polymer Blends,* Academic Press [1978], Vol. 1, pp. 16–20). They form transparent sheets and threads that exhibit no heterogeneity, independent of the staining method, under a phase contrast microscope or electron microscope.

Polycarbonate is one of the polymers, K, recited as component I. In accordance with the usual definition, a polycarbonate is to be understood herein as a usually thermoplastic polycondensation product of carbonic acid with a diol, built up out of

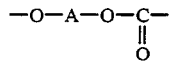

units, whereby A, for example, is derived from bisphenol A, i.e. 2,2-bis(4-hydroxyphenyl)propane, or from 1,1-(4,4'-dihydroxydiphenyl) cyclohexane, or from 2,2-(4,4'-dihydroxy-3,3',5,5'-tetrachlorodiphenyl) propane (cf. R. Vieweg and L. Goerden in *Kunststoff-Handbuch,* Vol. III [1973]: "Polyester", Hanser Verlag). They usually have an average molecular weight from 20,000 to 75,000, their density is generally $1.20 \pm 0.03$ g/cm$^3$, and their melting points are between 150° C. and 300° C.

Another polymer (I) that has been mentioned is polyvinyl chloride (PVC by DIN 7728). As usual, this should be understood as generally meaning thermoplastic resins having (-CH$_2$-CHCl-)$_r$ units, whereby r is generally 500 to 2000. Their density is generally 1.38 g/cm$^3$ and their chlorine content is about 56 percent by weight (cf. R. Vieweg and K. Krekeler in *Kunststoff-Handbuch,* Vol. II [1963]: "Polyvinylchlorid", Hanser Verlag).

Also mentioned is polyvinylidene fluoride (PVDF by DIN 7728). As with the usual definition, this should be understood as meaning (as a rule thermoplastic) polymers built up out of units -CH$_2$-CF$_2$. These polymers usually have an average molecular weight from 10,000 to 300,000 and a density of $1.77 \pm 0.02$ g/cm$^3$.

The following substances can be employed to form the copolymer (II):

The monomeric esters of acrylic acid and/or of methacrylic acid with C$_1$-C$_{10}$-linear or branched alcohols and/or of cycloalkanols (especially having 5-, 6-, or 8ring carbon atoms). Examples include esters of the C$_1$-C$_8$ alkanols, especially methyl methacrylate, methyl acrylate, butyl acrylate, ethyl methacrylate, n- and isopropyl acrylate and methacrylate, and i-butyl acrylate, cyclohexyl acrylate and methacrylate, and 3,3,5-trimethylcyclohexyl acrylate and methacrylate.

The monomers of the formula in II(B) (i) can in particular be those manufactured as described in U.S. Pat. No. 3,159,646 and 3,399,173. Of special interest are 2-(2'-hydroxy-3-methacryloyl-5'-alkyl) benzotriazole (wherein the alkyl is for example methyl or linear or branched octyl), 2-(2'-hydroxyphenyl)-5-methacryloylamido benzotriazole, and 2-(2'-hydroxyphenyl)-5-methacryloylamidomethyl benzotriazole.

Also particularly mentioned are compounds of the formula in II(B)(ii), particularly derivatives of 2-hydroxyphenone like those for example described in U.S. Pat. No. 3,107,199, especially 2-hydroxy-4-methacryloxybenzophenone, 2-hydroxy-4-acryloxybenzophenone, 2-hydroxy-4methacryloyl-5-tert.butylbenzophenone, 2-hydroxy-4-methacryloxy-2',4'-dichlorobenzophenone, 2-hydroxy- 4-(3-methacryloxy-2-hydroxypropoxy) -benzophenone, 4- (allyloxy) -2-hydroxybenzophenone, 3-allyl-2-hydroxy-4, 4'-dimethoxybenzophenone, 2,4-dihydroxy-4'-vinylbenzophenone, and those derivatives of hydroxyacetophenone disclosed in U.S. Pat. No. 3,265,760.

Also to be emphasized are substances of the formula in (II) (B) (iii), especially vinyl compounds like vinyl 4-ethyl-alpha-cyano-beta-phenylcinnamate, unsaturated ethers like 2-cyano-3,3-diphenylacryloxy) alkylene ether, and compounds of acrylic acid and methacrylic acid such as (2-cyano-3,3-diphenylacryloxy)-alkylene acrylate and 2-(acryloyl)-oxyethyl-2-cyano-3,3-diphenyl acrylate.

The monomers of copolymer (II) can be prepared by methods that are known in general or from the literature, or by similar methods.

The copolymerization of the additional monomers (C), which may be (meth)acrylnitrile, styrene, C$_1$-C$_4$-alkylated styrenes, polymerizable olefins having up to 4 carbon atoms, and vinyl ethers and vinyl esters having 3 to 10 carbon atoms in the molecule (cf. Ullmann's *Encyklopadie der Tech. Chemie,* Vol. 14, 3rd Ed., pp. 108–110), is usually avoided in the interests of the compatibility of polymers I and II, although they are permissible in certain instances.

Copolymer II is also manufactured by polymerization methods known in the art. An especially practical method involves the bead polymerization (suspension polymerization) of the monomers to form the copolymer. In bead polymerization the monomers are, as is known, distributed by mechanical forces, particularly agitation, in the form of a disperse phase throughout a continuous phase which is a non-solvent therefor, and then polymerized in that form. The resulting polymer is predominantly soluble in the monomer (cf. Houben-Weyl, 4th Ed., Vol. XIV/1: "Makromolekulare Stoffe," G. Thieme-Verlag, 1961, pp. 406-433 and H. Rauch-Puntigam & Th. Völker, *Acrylund Methacrylverbindungen,* Springer-Verlag, 1967). The monomer forms into spherical droplets that can be prevented from coagulating during the polymerization by adding distributing agents (protective colloids). When water is employed as the continuous phase, the monomers are primarily those that are difficult or impossible to dissolve in that medium.

The distributing agents are (water illsoluble) salts of inorganic acids such as alkaline earth sulfates or alkaline earth carbonates, silicates, and aluminum hydroxide, the effect of which can be augmented by adding very slight amounts of emulsifiers (cf. U.S. Pat. No. 2,673,194 and Makromolekulare Chem. 13, 80 [1954]). Such agents also include high molecular weight natural products or synthetic polymers. The group of high molecular weight distributing agents includes water soluble colloids such as polyvinyl alcohol, partly hydrolyzed polyvinyl acetate, methylcellulose, starch, gelatin, pectin, the alkali metal salts of polyacrylic acid, the alkali metal salts of styrene, copolymers of vinyl acetate and maleic acid anhydride, etc. (cf. Houben-Weyl, loc. cit., pp. 411-430). The ratio of the aqueous to the monomeric phase is usually between 2:1 and 4:1. In contrast to emulsion polymerization, initiators are employed in bead polymerization which are, to a first approximation, soluble in the monomer and insoluble in water. They include, for example, peroxy or corresponding azo compounds such as dibenzoyl peroxide, lauroyl peroxide, t-butyl peresters like t-butyl perpivalate, and azo-bis-(isobutyronitrile). Usually from 0.1 to 1 percent and preferably 0.5 percent by weight of the monomer of initiator is employed. The bead size can range from 0.01 mm to a few millimeters depending on the requirements.

The desired range of molecular weights can also be obtained by means of regulators (chain transfer agents). These include the known mercaptan regulators, especially aliphatic mercaptans (cf. U.S. Pat. No. 2,450,000) such as lauryl mercaptan and dodecylmercaptan.

In practice, the aqueous phase can be put along with the distributing agent in an apparatus equipped with an agitator and then heated to reaction temperature. Advantageous temperatures are around 80° C.±10° C. The monomers are then suitably added to the agitated batch together with the initiator and the regulator, if any. The agitator is usually set at 200 to 1000 rpm. It is advantageous for the average bead size to be between 30 and 200 microns. The polymerization typically lasts 1 or 2 hours and is suitably followed by thermal processing, usually somewhat above the reaction temperature, for about 1 hour. The beads are then filtered out and dried. Copolymer II can also be prepared by block polymerization, subject to pressure if necessary.

The compatible polyblends can exist in the form of so-called "mechanical polyblends", meaning that they are obtained by the intensively mechanical mixing of components I and II in a mixer, extruder, or similar device. They can also be obtained from a common solvent in the form of so-called "solution-cast" polyblends (cf. Kirk-Othmer, *Encyclopedia of Chemical Technology*, 3rd Ed., Wiley, 1982, Vol. 18, pp. 443–478). The compatible polyblends can also contain other optional conventional additives such as plasticizers, lubricants, and stabilizers, to the extent that these do not deleteriously affect the miscibility of the components or the single phase nature of the blends. Generally these additives account for less than 3 percent by weight of the blend. A preferred preparatory method is described below.

First, a blend of components I and II is created, preferably commencing with a granulate (I) like granulated polycarbonate and with copolymer (II) in the form, for example, of a bead polymer, and employing a slow mixing device like a drum, Rhön wheel, or two-chambered plowshare mixer. The slowly revolving mixer produces a mechanical blend without destroying the phase boundaries (cf. Ullmann's Encyklopädie der Tech. Chemie, 4th Ed., Verlag Chemie, Vol. 2, pp. 282–311). Next, thermoplastic preparation follows by homogeneous blending in a melt, employing heatable mixers at an appropriate temperatures from 150° C. to approximately 300° C., for example in a kneader or, preferably, an extruder such as a single- or multiple-screw extruder, or in an extruder having an oscillating screw and shearing pins.

Granulates having uniform grains (e.g. hot knock-over, cubical, or round) can be created by this process. The grains range from 2 to 5 mm in size.

The preferred field of use for the compatible polyblends in accordance with the invention is for coating pieces made of a synthetic resin, especially of polycarbonate, polyvinyl chloride, or polyvinylidene fluoride. The pieces can be coated in a known way by lacquering, coextrusion, backing, etc. Layers 10 to 100 microns thick are generally employed.

The compatible polyblends in accordance with the invention can also be used to advantage in the uses described below.

Sheets of polycarbonate or so-called double or triple webbed sheets of polycarbonate can be coextruded together with miscible polyblends of polycarbonate and of a copolymer II (cf. German Patent 1,609,777). The technology disclosed in U.S. Pat. No. 4,576,870 can be employed in a practical way. What turns out to be especially advantageous is that the ultraviolet absorber does not evaporate and adhesion to the base is very satisfactory because both base and outer layer are to a large extent made out of the same material. Furthermore, there are no problems of compatibility between the core and the outside layer, which is also an advantage in relation to using regranulated polymer. Reference should also be made to the high thermal stability of mixtures of polycarbonate with polymeric ultraviolet absorber when used as a coextrusion compound.

Miscible polyblends of polyvinyl chloride and copolymer P have also proven satisfactory as protective lacquers for polyvinyl chloride articles. Anti-ultraviolet sheets with water vapor barrier properties and adaptable to use as aircraft windshields are also easy to produce. Miscible polyblends of polyvinylidene fluoride and of a copolymer P consisting of methyl methacrylate and of 3-(2-benzotriazoloyl)-2-hydroxy-5-tert.octylbenzyl methacrylamide should be mentioned.

The following Examples will illustrate the invention. In these Examples, glass transition temperatures, Tg, were determined by differential scanning calorimetry (DSC) (cf. Edith A. Turi, Editor, *Thermal Characterization of Polymeric Materials*, Academic Press, 1981, pp. 165 ff.), Vicat softening points (VSP/B) in accordance with DIN 53 460 (ISO 306), melt-flow indexes (MFI) in accordance with DIN 53 735 (ISO R 1133), and bulk densities ($d_R$) in accordance with DIN 53 479 (ISO R 483).

The polymers (I) employed can be polycarbonates, for example of the following types commercially available under the tradename "MAKROLON".

|  | Molecular Weight | VSP/B (°C.) | MFI (9–10 min.) | $d_R$ (g/cm$^3$) |
|---|---|---|---|---|
| "MAKROLON 1143" |  |  |  |  |
| "MAKROLON 2400" | 24,000 | 145 | 1–19 | 1.2 |
| "MAKROLON 2800" | 28,000 | 148 | 7–10 | 1.2 |
| "MAKROLON 3100" | 31,000 | 150 | 3.5–5 | 1.2 |
| "MAKROLON 3200" | 32,000 | 150 | 3.5–5 | 1.2 |

Polyvinyl chloride can also be employed, for example "VINNOL" (designated M 6160G by DIN 7746). Its characteristic properties are viscosity (by DIN 53 726) 92 cm$^3$/g, density (by DIN 53 479) 1.39 g/cm$^3$, and chlorine content (by DIN 53 474) 56 percent. Also appropriate is polyvinylidene fluoride, for example, "SOLEV X8N-XION", having a Vicat softening point from 145° C. to 151° C. and a density of 1.78 g/cm$^3$. Grain size can be determined as described in Ullmann's *Encyklopadie der Tech. Chemie*, 4th Ed., Volume 2, pages 24–69. Specific viscosity, $\eta_{spec/c}$ is determined in accordance with DIN 1342, 51562, and 7745 (CHCl$_3$ in an Ubbelohde microviscosimeter, cf. also Houben-Weyl, 1961, Vol. 14/1, pp. 81–84).

Example 1

Preparing a copolymer (II) by bead polymerization 1000 parts by weight of an aqueous phase containing 1 part of Al(OH)$_3$ and 0.01 part of sodium alkylsulfonate as a dispersant are heated to 80° C. in a round 2-liter flask equipped with a condenser, thermometer, and stirrer. At that temperature, 225 parts of a monomer, solid at room temperature, of formula (II), i.e. of a polymerizable ultraviolet absorber, are added, followed by 275 additional parts of the monomer containing 5 parts of lauroyl peroxide as an initiator and 5 parts of dodecyl mecaptan as a chain transfer agent.

Polymerization takes between 1 and 2 hours at 80° C. depending on the composition of the monomer and is followed by 1 hour of tempering at 85° C.

The grains are between 50 and 200 microns in size.

The copolymers listed in Table I were prepared by this method.

Example 2

Obtaining the compatible polyblends 85 parts by weight of granulated polycarbonate ("MAEROLON 2800") are blended for 3 to 5 minutes in a drum-type mixer with 15 parts by weight of a bead polymer consisting of 55 percent by weight of methyl methacrylate and 45 percent by weight of 3-(2-benzotriazolyl)-2-hydroxy-5-tertooctylbenzyl methacrylamide. The mixture is then placed in a single-screw extruder (the screw being 30 mm long and 21 mm in diameter) and extruded at 240° C. for a residence time of 3 to 4 minutes. The resulting molten billets were broken up in a granulator.

TABLE I

| | Compatible polyblends | | | | | | |
|---|---|---|---|---|---|---|---|
| | Composition | | | | Properties | | |
| | Component I | | Component II | | $\eta_{sp}/c$ | Appearance of | $T_g$ |
| Ex. No. | % by wt | Polymer K | % by wt | Copolymer P | (ml/g) | Polyblend | (°C.) |
| 3 | 80 | PC (Makrolon ® 1143)[1] | 20 | MMA + BHM[2]<br>Tg = 95° C.<br>$M_w = 3.2 \cdot 10^4$<br>(55:45 pbw) | 20 | clear, yellowish | 120 |
| 4 | 85 | PC (Makrolon ® 1143)[1] | 15 | MMA + BHM[2]<br>Tg = 95° C.<br>$M_w = 1.5 \cdot 10^4$ | 11 | " | 130 |
| 5 | 85 | PC (Makrolon ® 2400) | 15 | MMA + BHM[2]<br>Tg = 95° C.<br>$M_w = 1.9 \cdot 10^4$ | 13 | " | 127 |
| 6 | 85 | PC (Makrolon ® 2800) | 15 | MMA + BHM[2]<br>Tg = 95° C.<br>$M_w = 3.4 \cdot 10^4$ | 21 | " | 128 |
| 7 | 85 | PC (Makrolon ® 3100) | 15 | MMA + BHM<br>Tg = 94° C.<br>$M_w = 1.9 \cdot 10^4$ | 13 | " | 126 |
| 8 | 85 | PC (Makrolon ® 3200) | 15 | MMA + BHM<br>Tg = 94° C.<br>$M_w = 3.2 \cdot 10^4$ | 20 | " | 132 |
| 9 | 85 | PC (Makrolon ® 3100) | 15 | MMA + MA + BHM<br>Tg = 92° C.<br>$M_w = 1.9 \cdot 10^4$<br>(50:5:45 pbw) | 13 | " | 136 |
| 10 | 85 | PC (Makrolon ® 3100) | 15 | MMA + BA + BHM<br>Tg = 88° C.<br>$M_w = 2.4 \cdot 10^4$<br>(50:5:45 pbw) | 16 | " | 132 |
| 11 | 98 | PC (Makrolon ® 1143) | 2 | MMA + BHM<br>Tg = 93° C.<br>$M_w = 2.6 \cdot 10^4$<br>(40:60 pbw) | 17 | " | 145 |
| 12 | 70 | PC (Makrolon ® 1143) | 30 | MMA + BHM<br>Tg = 98° C.<br>$M_w = 5 \cdot 10^4$<br>(99.9:0.1 pbw) | 29 | | 125 |
| 13 | 99 | PC (Makrolon ® 1143) | 1 | BA + HB<br>Tg = −10° C.<br>$M_w = 1.3 \cdot 10^4$<br>(70:30 pbw) | 10 | " | 143 |
| 14 | 97 | PC (Makrolon ® 1143) | 3 | EMA + HMB<br>Tg = 70° C.<br>$M_w = 1.5 \cdot 10^4$<br>(95:5 pbw) | 11 | clear, yellowish | 138 |
| 15 | 85 | PC (Makrolon ® 1143) | 15 | MMA + CEM<br>Tg = 92° C.<br>$M_w = 2 \cdot 10^4$<br>(80:20 pbw) | 14 | " | 130 |
| 16 | 90 | (Makrolon ® 1143) | 10 | MMA + HBP<br>Tg = 88° C.<br>$M_w = 2.9 \cdot 10^4$<br>(90:10 pbw) | 18 | " | 132 |
| 17 | 85 | PVC (Vinnol ® Y61M)[3] | 15 | MMA + BHM<br>Tg = 96° C.<br>$M_w = 7.5 \cdot 10^4$<br>(55:45 pbw) | 38 | " | 75 |
| 18 | 50 | PVDF (Solev ® XP8N)[4] | 50 | MMA + BHM<br>Tg = 100° C.<br>$M_w = 8 \cdot 10^4$ | 40 | " | 88 |

| | Compatible polyblends | | | | | |
|---|---|---|---|---|---|---|
| | Composition | | | | Properties | |
| | Component I | | Component II | | $\eta_{sp}/c$ | Appearance of | $T_g$ |
| Ex. No. | % by wt | Polymer K | % by wt | Copolymer P | (ml/g) | Polyblend | (°C.) |
| | | | | (50:50 pbw) | | | |

[1)]Polycarbonate trade names: Makrolon ® 1143 (Bayer AG) etc.
[2)]Abbreviations
BA = butyl acrylate
BHM = 3-(2-hydroxyphenyl-benzotriazolyl)-2-hydroxy-5-tert.octylbenzyl methacrylamide
EMA = ethyl methacrylate
HB = 2-(2′-hydroxyphenyl)-5-methacryloylamido benzotriazole
MA = methyl acrylate
MMA = methyl methacrylate
HMB = 2-(2′-hydroxyphenyl)-5-methacryloylamido-methylbenzotriazole
CEM = 2-(2-cyano-3,3-diphenylacryloylamido-ethyl)-methacrylate
HBP = 2-(hydroxy-3-methacryloyloxy)-benzophenone
[3)]Polyvinyl chloride trade name: Vinnol ® Y61M (Wacker AG)
[4)]Polyvinylidene fluoride trade name: Solev ® XP8N (Solvay SA)

In an analogous fashion the compounds corresponding to formula I as described in US-P 4 576 870 can be utilized.

What is claimed is:
1. A compatible, single-phase, polyblend comprising
I) a polymer which is member selected from the group consisting of polycarbonates having a molecular weight from 20,000 to 75,000, polyvinyl chlorides having a molecular weight from 31,250 to 125,000, and polyvinylidene fluorides having a molecular weight from 10,000 to 300,000, and
II) a copolymer having a molecular weight from 10,000 to 70,000 and comprising
A) 40 to 99.99 percent by weight of a monomeric ester formed between (i) an alcohol having from 1 to 10 carbon atoms and (ii) at least one member selected from the group consisting of acrylic acid and methacrylic acid,
B) 0.01 to 60 percent by weight of a monomer of the formula

$$\begin{array}{c} R_1 \ O \\ | \ \| \\ H_2C=C-C-Y-Z, \end{array}$$

wherein $R_1$ is hydrogen or methyl, Y is oxygen or $-NR_2-$ where $R_2$ is hydrogen or alkyl having 1 to 6 carbon atoms, and Z is a member selected from the group consisting of
    i) a ) 2-hydroxyphenylbenzotriazoles of the formula

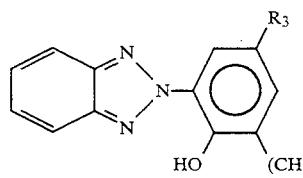

which formula includes a benzotriazole ring, wherein $R_3$ is hydrogen or ($C_1$–$C_{12}$) alkyl and q is an integer from 1 to 4, such 2-hydroxyphenylbenzotriazoles which are halogen substituted, and such 2-hydroxyphenylbenzotriazoles wherein said benzotriazole ring is substituted by ($C_1$–$C_4$) alkyl,
    i) b) 2-hydroxyphenylbenzotriazoles of the formula,

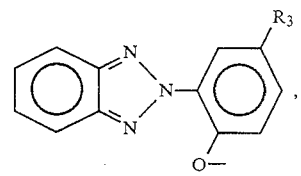

which formula includes a benzotriazole ring, wherein $R_3$ is hydrogen or ($C_1$–$C_{12}$) alkyl, such 2-hydroxyphenylbenzotriazoles which are halogen substituted, and such 2-hydroxyphenylbenzotriazoles wherein said benzotriazole ring is substituted by ($C_1$–$C_4$) alkyl, and
    i) c) 2-hydroxyphenylbenzotriazoles of the formula

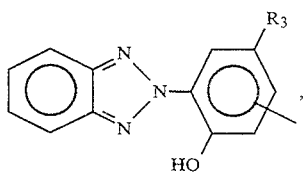

which formula includes a benzotriazole ring, wherein $R_3$ is hydrogen or ($C_1$–$C_{12}$) alkyl, such 2-hydroxyphenylbenzotriazoles which are halogen substituted, and such 2-hydroxyphenylbenzotriazoles wherein said benzotriazole ring is substituted by ($C_1$–$C_4$) alkyl,
    ii) compounds of the formula

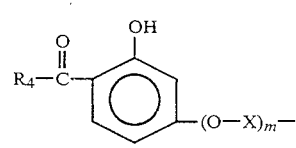

wherein m is 0 or 1, X is alkylene having 1 to 4 carbon atoms or is such alkylene substituted with hydroxy, and $R_4$ is phenyl, methyl, substituted phenyl, or substituted methyl, and
    iii) α-cyano-β,β-diphenyls of the formula

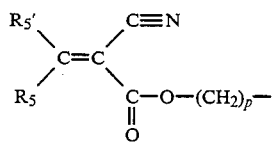

wherein p is an integer from 1 to 4 and $R_5$ and $R_5'$ are phenyl or phenyl substituted by $C_1$–$C_4$ alkyl, and C) 0 to 30 percent by weight of other monomers.

2. A compatible polyblend as in claim 1 wherein polymer I is 50–99.9 percent by weight thereof and copolymer II is 0.1–50 percent by weight thereof.

3. A compatible polyblend as in claim 1 wherein the molecular weight of said copolymer II is from 10,000 to 70,000, as determined by gel chromatography.

4. A compatible polyblend as in claim 1 wherein said copolymer II has a glass-transition temperature, Tg, from 60° C. to 150° C. before being blended.

5. A compatible polyblend as in claim 1 wherein said copolymer II is prepared by bead polymerization.

6. A method for coating a synthetic resin which comprises coating it with a polyblend as in claim 1.

7. A coated polymer made by the method of claim 6.

* * * * *